May 13, 1947.  S. P. KINNEY  2,420,398
METHOD OF OPERATING BLAST FURNACES
Filed Dec. 20, 1943
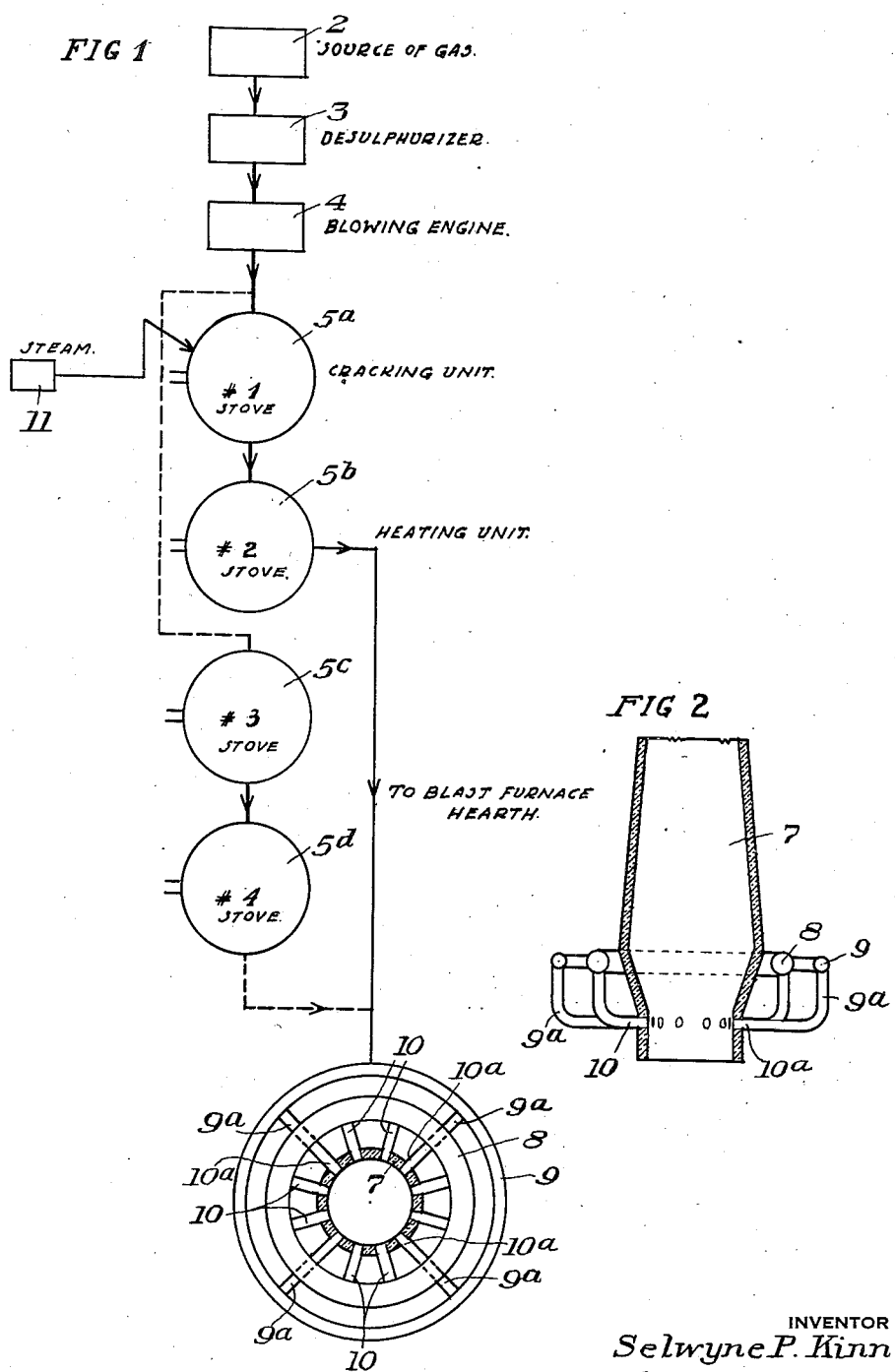
INVENTOR
Selwyne P. Kinney
by his attorneys
Christy, Parmelee, Strickland Patented May 13, 1947

2,420,398

UNITED STATES PATENT OFFICE 2,420,398

METHOD OF OPERATING BLAST FURNACES

Selwyne P. Kinney, Crafton, Pa., assignor to S. P. Kinney Engineers, Inc., Pittsburgh, Pa., a corporation of Pennsylvania Application December 20, 1943, Serial No. 514,935

3 Claims. (Cl. 75—42)

This invention pertains to blast furnaces and the like, and a method of operating the same. More especially the invention pertains to a method and apparatus whereby the effective capacity of a furnace may be increased, and the coke consumed reduced.

This invention is primarily adapted for blast furnaces for producing iron, and will be specifically described in that connection, but is also applicable to other smelting operations using a vertical furnace or "shaft," and the term "blast furnace" will be used as a generic term for like structures for the treating of metals or metal bearing ores.

In the smelting of iron ore in a blast furnace, metallurgical coke is the fuel or reducing agent that is employed, this coke being either by-product or bee-hive coke. The cost of this coke in the blast furnace charge or burden varies in accordance with the location of the plant, and the circumstances surrounding the production of the coke, but in any event the cost of the coke is a considerable portion of the total cost of the materials used. Additionally, the coke occupies a considerable part of the space inside the furnace which contains the charge.

In the ordinary blast furnace, heated air is forced into the lower portion or hearth of the furnace through an annular series of nozzles, known as tuyères. At the tuyère zone in the furnace the oxygen in the blast combines with the carbon of the coke, immediately before the tuyères, i. e., just where the tuyères open into the furnace hearth. The heat generated by this combination is carried into the charge, other coke being heated to incandescence. The $CO_2$ (carbon dioxide) contacting the hot coke is reduced to carbon monoxide (CO). The CO in turn combines with oxygen in iron ore (for example $Fe_2O_3$) to produce iron, the CO again being converted to $CO_2$. So called "direct reduction" also takes place; however, it is believed that this progresses through the medium of carbon monoxide. Hydrogen is also present from the breaking down of water vapor present in the air constituting the blast when the air strikes the hot coke. The breaking down or dissociation of the water produces, in addition to hydrogen, oxygen which is immediately combined with carbon and at the existing furnace temperature forms carbon monoxide. I have found from study of gases in the hearth and bosh of the furnace that the presence of carbon dioxide is confined to a zone or region which is very near the tuyère, and that this gas is only present momentarily in its transition to carbon monoxide, and likewise any water resulting from the combination of H and O will persist only temporarily. This is due to the high temperature existing in the hearth and bosh.

The temperatures existing at the nose of the tuyère of the blast furnace and in the hearth and bosh section have been well established. I have observed spot temperatures with optical pyrometers of approximately 1700° C. The existence of this temperature is due to the formation of carbon dioxide immediately before (i. e., in front of) the tuyères and this high temperature falls off rapidly as the carbon dioxide is reduced to carbon monoxide and with the increase in distance from the nose of the tuyère. (See S. P. Kinney, Combustion of coke in the blast furnace hearth, Am. Inst. Min. & Met. Engrs., 1923.) I have made various temperature measurements in the hearth section and have found in one case an average temperature slightly under 2400° F.

From results of published data available on the iron blast furnace it may be easily established that the gases present in the hearth are carbon monoxide and hydrogen (and nitrogen) and that the average temperature of this zone is in the vicinity of 2400° F. This condition exists due to the combustion of the coke to carbon monoxide with the dissociation of the water vapor present, nitrogen being present in the air. If carbon monoxide and hydrogen at 2400° or above, say 2600° F. are added to the hearth of the furnace at the tuyère level or below, the mechanism of reduction will be promoted and augmented by so doing, since both of these gases are reducing agents and the oxides of iron descending in the shaft and bosh of the furnace are not particular in choice of the source of the reducing agent as long as it is present with the reducing agent at the proper temperature to promote the reaction. By such introduction of carbon monoxide and hydrogen in the hearth, I can then replace a portion of the solid carbon charged into the top of the furnace. This is possible since it has been shown in many studies on various sponge iron processes that the reduction of iron oxide to metallic iron may be effected with gaseous fuels only, and without the presence of solid carbon in the charge, provided that the proper temperature is maintained. It is not the purpose here to eliminate the solid fuel (coke) in the blast furnace burden, but part of the solid fuel may be replaced by carbon monoxide and hydrogen provided that this is done in such manner as to avoid cooling the charge in the furnace.

J. E. Johnson (Principles, Operations & Products of the Blast Furnace, 1918), pointed out the importance of maintaining a critical temperature in the hearth of the furnace, and how easily the whole system may be upset if additional heat demands are placed on this portion of the furnace. Therefore, if the fuel gases added to the hearth contains water vapor or carbon dioxide in substantial amounts, an additional heat demand is imposed in the region or zone of the hearth of the furnace, and cooling results. Also, the presence of other gases than water vapor or carbon dioxide which would, for one reason or another, tend to absorb heat from the zone of the hearth must be avoided and any fuel gases employed as reducing agents, must be properly prepared or conditioned. For example, if hydrocarbon fuels, such as natural gas, fuel oil or coke oven gas, be used, they may tend to break down or "crack" in the hearth of the furnace. This cracking absorbs heat from the hearth. In the cracking the hydrocarbons are reduced to elementary hydrogen and carbon, and as such may be valuable reducing agents. In order that this cracking of the fuel may not occur in the hearth and thereby absorb or use heat required to maintain the proper temperature for reducing metal in the furnace, I effect this cracking before the fuel is introduced into the furnace. The carbon so formed may be converted, before introduction into the blast furnace to carbon monoxide, or it may be carried with the hydrogen in finely divided solid form into the hearth, this depending upon the cracking treatment which is used, and the type of apparatus employed and the physical form in which the elemental carbon is produced and deposited in the cracking apparatus.

Moreover, in using gaseous fuel to reduce the consumption of coke, there is less coke burned in the furnace, i. e., less coke converted from carbon to carbon monoxide, and hence there is less heat generated in the furnace. This must be offset if the proper thermal balance in the furnace is to be retained. This may be done by increasing the blast temperature and/or preheating the reducing gases to a temperature approximating or preferably exceeding the normal average hearth temperature. Considering the rather exact conditions of thermal balance to be maintained, the importance of first preparing the gas by cracking, or converting it to eliminate water and to form carbon and для carbon monoxide and hydrogen before admission to the hearth zone may be realized, and the importance of otherwise processing the gas to avoid absorption of heat from the fuel bed will be appreciated. Therefore the added gas must contain a sufficient amount of sensible heat to replace the deficiency in heat created by the coke displaced. I prefer to accomplish this by adding enough sensible heat to the gas and to add gas of sufficient volume to carry the needed heat to the hearth. A portion of the required heat, however, may as above indicated, be added to the hearth through the use of higher blast temperatures, although in some operations it has been found that there is a limit to the amount of heat (temperature of blast) which a furnace may take. To such extent as it is feasible to raise the temperature of the blast, it may be preferable to do so, and thereby more economically employ the blast furnace gas for heating the stoves in which the air is heated.

To such extent as coke may be replaced by gaseous reducing agents, the volume or space available for iron ore is increased, or coke consumption is decreased. In many cases certain hydrocarbon and water gas fuels are abundantly available, but have not been useable for blast furnace operations. Furthermore, in certain operations, good blast furnace coke is expensive, while the by-product gas from the coke ovens may not have a ready outlet. In such instances, valuable hydrocarbon gas is either wasted or finds an unsatisfactory market.

In accordance with the present invention, hydrocarbon and gaseous fuel, especially this by-product coke oven gas are employed, after certain treatments to be described hereinafter, as auxiliary fuel in the iron blast furnace, thereby reducing the burden of coke. Such gas has substantial califorific value and this utilization of the gas as fuel, in accordance with the present invention, enables a substantial reduction in the amount of coke to be effected.

The present invention, therefore, may be said to have as one of its objects, the utilization of hydrocarbons, as oil, natural gas, or a reducing gas from other sources, as a fuel in the blast furnace smelting of iron ore, replacing substantial amounts of coke which heretofore have been required for the smelting fuel.

A further object of the invention is the provision of a method of treating or preparing such fuels for making them suitable for use as fuel in the blast furnace, and in the adaptation of a blast furnace and its auxiliary equipment for the use of such fuels.

Other objects and advantages of the invention will become apparent as the description proceeds, and the features of novelty will be pointed out in particularity in the appended claims.

While it has heretofore been proposed to inject auxiliary fuel into the hearth of a blast furnace, this procedure, as previously attempted, has resulted in a cooling of the charge and a cooling down of the furnace or a reduction in its output. This is attributable to several causes, the first of which is that the auxiliary fuel is generally admitted cold, and it must be brought up to the temperature of the reactants in the hearth, after it has been so introduced, and the auxiliary fuel thereby abstracts heat from the hearth section of the furnace. The second reason that cooling takes place is on account of the heat that is required to break up or "crack" fuel gas, such as methane or other hydrocarbons which are present in the coke-oven gas before it will function effectively as a reducing agent. Third, the presence of water vapor in the gas admitted requires heat for dissociation at the tuyère level. For example, in methane ($CH_4$) carbon and hydrogen exist in chemically combined form, and to separate them requires heat energy. Another factor that is important is the reversibility of the reactions when the coke is at a proper temperature for smelting, $CO_2$, as above pointed out, being reduced to CO and $H_2O$ to hydrogen and oxygen.

The invention may be understood more readily by reference to the accompanying drawings, wherein:

Fig. 1 is a diagrammatic flow sheet of the process and apparatus comprising the present invention;

Fig. 2 is schematic section through a blast furnace equipped with facilities for handling the auxiliary fuel as contemplated by the present invention.

In the drawings, 2 is a source of gas, 3 a desulphurizer, 4 a blower, 5a and 5b are one pair of blast furnace stoves and 5c and 5d are another pair. The blast furnace is designated 7, and has two bustle pipes, 8 and 9, which supply tuyères 10 and 10a.

In utilizing coke-oven, or similar gas as a reducing agent, it is preferred, where necessary, to desulphurize the gas by any suitable method, as is well known in the art. This desulphurization is followed by a special treating process which increases the volume of the gas, increases its sensible heat value, and brings it to a suitable temperature for use as fuel in the blast furnace.

After desulphurizing, the gas is subjected to an endothermic or "cracking" operation, wherein the hydrocarbons present in the gas are for the most part at least, cracked and the reduction of carbon dioxide to carbon monoxide takes place. By this treatment, active reducing agents in the form of hydrogen and carbon monoxide are obtained. This treatment may take place in any suitable unit, it being preferred, however, to use an ordinary blast furnace stove in combination with a source of water in the form of high pressure steam. However, in the case of gases containing mainly methane cracking may be obtained by heating only without using water vapor.

When the cracking is carried out in a blast furnace stove, the stove is first heated as is customary by burning enriched blast furnace gas therein, and then the fuel gas is passed through the stove for a period of time until the checkers are cooled down to a point where the heat of the stove has been partially consumed.

During passage of the gas, water preferably in the form of superheated steam is added continuously, so that the product of the stove is hydrogen and carbon monoxide, in accordance with the following reaction:

$$CH_4 + heat = C + 2H_2$$
$$C + H_2O + heat = H_2 + CO$$

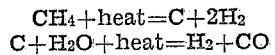

Under certain circumstances I prefer to crack or reform gases containing butane or mixtures of butane and methane after the Maier process described in Sponge Iron Experiments at Mococo U. S. Bureau of Mines Bulletin 396 where carbon monoxide and hydrogen are formed from methane and butane by reaction with preheated air and water vapor. The gas formed is practically free of water vapor, and there is some nitrogen present which added to the gas volume provides heat carrying capacity to the gas. Both hydrogen (H) and CO (carbon monoxide) are effective reducing agents for taking oxygen from the iron ore and reducing the ore to metal. Higher hydrocarbons in the gas will in like fashion be cracked into their constituent elements, H and C. However, the temperature of the gas from the reaction unit is not high enough to be introduced into the hearth of the blast furnace, and if so introduced at this time, it would cause undesirable cooling of the hearth, and a slowing down of the furnace operations, rather than an acceleration thereof.

The gas from the cracking stove is therefore passed into a second stove, where it is heated to a temperature comparable at least to the average temperature that exists in the blast furnace hearth under normal conditions of operation, i. e., around 2600° F. or higher. It is preferred to employ a total of four stoves in the gas treating system, so that there will be always available two stoves for the cracking and heating of the gas, the other two stoves meanwhile being brought up to temperature for changing over when the first two have been cooled by the passage of the gas therethrough.

After the coke-oven gas has been desulphurized, treated or cracked, and heated, as described above, it is ready for introduction into the hearth, and is a very active reducing agent. This gas has certain advantages over the gas which is normally formed in the blast furnace hearth, in that the gas contains considerably less inert nitrogen than the gas which is generated in the tuyères. This so-called bosh gas, or the gas which is generated at the tuyères, usually contains about 62 to 64 per cent of nitrogen, while coke-oven gas, contains about 8 per cent (by volume). However, the treating or cracking process increases the total volume of gas being introduced to something over twice its original volume, and, therefore, the overall nitrogen in the auxiliary gas being introduced into the hearth is about 3 to 4 per cent. Therefore, this gas carries considerably less inert gas than bosh gas, and the active reducing ingredients are over 90 per cent by volume, as compared with about 33 to 34 per cent for bosh gas.

In order to accomplish the introduction of the gas into the hearth of the blast furnace, it is preferred, first, to put the gas from the coke ovens under suitable pressure for introducing it into the hearth of the furnace. This pressure should be slightly higher than the normal operating blast furnace pressure at the tuyères of the furnace, a gas pressure of from 18 to 24 pounds being employed in practice.

As shown in the drawings, four stoves may be employed for the cracking or heating of the gas. These are arranged in two sets of two with the two stoves of each set in series. Thus while one set is on the heating up cycle, being raised to an operating temperature, the other two are on the operating cycle. Other well known forms of heat exchangers, as for example, recuperators, may be employed in place of all or some of the stoves, as will be readily understood by those skilled in the art. In Fig. 1, the dotted lines indicate the switchover from one pair of stoves to another.

I have found that in a usual blast furnace up to 75.6 per cent of the oxygen in the ore as iron oxide is removed in the hearth and bosh of the furnace, in the region extending from the plane of the tuyères upwardly for about 24 feet. (See S. P. Kinney, "The blast furnace stock column," U. S. Bureau of Mines Technical Paper #422, p. 130.)

Due to the fact that it has been shown that the greater part of the reduction of the iron oxide is carried on low down in the furnace, I therefore prefer to add any supplemental gases to the furnace at a point near, or in between, the tuyères of the furnace, or possibly below the tuyères of the furnace. To this end I preferably employ a separate bustle pipe 9, Figs. 1 and 2, which may be referred to as an auxiliary bustle pipe, which is connected to the stove system and is well insulated. The auxiliary bustle pipe 9 is illustrated as being positioned concentrically with the main or heated air blast, bustle pipe 8, both pipes surrounding the furnace 7, as shown, and the bustle pipe 9 is shown as being of smaller diameter than the bustle pipe 8, but these details are illustrative, and not limiting, in character. From the auxiliary bustle pipe 9, the prepared gas is led through pipes 9a to the tuyère level, and is introduced into the furnace through tuyères 10a, these conveniently being a portion of the regular tuyères 10 which ordinarily are used only for the introduction of air. Usually, in practice, the number of tuyères required for the introduction of the prepared gases from one-fourth to one-third of the total number of tuyères on the furnace, the gas-introducing tuyères being spaced substantially uniformly around the furnace. The steam generator for supplying steam to the converting unit is designated 11.

The following data are illustrative of the process of the present invention, and the advantages to be attained therefrom; the data being based on coke-oven gas as the auxiliary fuel gas being treated and thereafter employed as described above:

COKE OVEN GAS

*Composition*

|  | Per cent by Volume | Per cent by Weight |
|---|---|---|
| $CO_2$ | 2.2 | 3.22 |
| $O_2$ | .8 | .90 |
| $N_2$ | 8.1 | 7.59 |
| CO | 6.3 | 59.72 |
| $H_2$ | 46.5 | 3.22 |
| $CH_4$ | 32.1 | 17.37 |
| $C_4H_{10}$ | 4.0 | 7.98 |
|  | 100.00 | 100.00 |

The gas after cracking has substantially the following composition:

|  | Per cent by Volume | Per cent by Weight |
|---|---|---|
| CO | 3.30 | 73.94 |
| $H_2$ | 23.94 | 15.98 |
| $N_2$ | 72.76 | 10.08 |

The heating value of the thus treated and prepared coke-oven gas is 280 B. t. u. per cubic foot and the volume of the treated or cracked coke oven gas is 2.456 times the volume of the original gas.

Assuming that there are available 7,000,000 cu. ft. of coke oven gas, there would be produced by the treating or cracking process approximately 17,000,000 cu. ft. of cracked gas, which amount is equivalent in heating value to 170 tons of coke, but for conservative calculation, 10,000,000 cubic feet may be considered as the practical equivalent of this amount of coke.

The water required for treating this amount of coke oven gas is approximately 3,000,000 pounds.

While coke oven gas has been described above as the material which is treated and utilized in accordance with the present invention, it will be understood that the invention is applicable in similar manner to other gases that have a substantial fuel value when similarly treated and introduced into the blast furnace hearth. Thus, gases such as natural gas, or any gas rich in carbon monoxide and/or hydrocarbons such as methane, may be employed, or the process is applicable even to producer gas. If producer gas is employed, however, it is desirable to pass it through a bed of incandescent carbon before it is treated or cracked, in order to reduce its carbon dioxide content to carbon monoxide before reaction with steam. For the purpose of the reduction, the carbon bed may be maintained in a cupola, for example, or it may be heated in any other equipment through which the gas may be passed on its way to the cracking unit. Also, instead of using hydrocarbon fuel, petroleum, fuel oil or other normally liquid hydrocarbons may be cracked and used.

The invention enables gaseous by-products to be used effectively which have substantial heating values, but which have been utilizable heretofore only, at most, in limited amounts in limited applications; and important savings in coke are effected by the present invention, with increased yields from the furnace, since the coke which is saved can be replaced effectively and efficiently by increased amounts of iron ore in the furnace burden. In regions where coke is scarce but gas is plentiful, or where poor coking good gas producing coal is available, the invention will find particular utility. The invention will not only reduce the burden of coke, but by reducing coke will also reduce sulphur and slag. The invention is of importance from the angle of conservation, in that less coke producing facilities may supply adequate coke for present production, and the reserve of coking coal may be extended.

In practice, the steam is introduced into the cracking stove at a temperature of from approximately 700° F. to 900° F., and the resulting cracked and reacted gaseous fuel, rich in free hydrogen, is preheated to a temperature of at least approximately 2600° F., and introduced into the furnace hearth at such temperature, this being somewhat higher than average temperature of the hearth; however, higher temperatures may be preferable, as has been pointed out above. Additionally, in practice, the steam is admitted into the cracking stove in substantially stoichiometric ratios with respect to the gas undergoing reaction. Instead of deriving all or part of the heat for cracking the gas from the blast furnace, some of the coke-oven gas may be burned with air. For example, about 3-6% of the coke-oven gas may be burned with air in a suitable unit and the heat produced thereby either used entirely to heat the cracking stove or other reactor, or to supplement or enrich the blast furnace gases, thereby easily producing temperatures conducive to the cracking of methane.

My invention, as hereinbefore described, contemplates the introduction at the hearth of a blast furnace of a reducing gas which has been heated to approximately hearth temperature, and which has been processed to reduce hydrocarbons to CO, or C and H, and $CO_2$ to CO, and $H_2O$ (where present) to H and O or CO, whereby all of the more important endothermic reactions take place in advance of the gases entering the hearth. My invention also is based on supplying enough heat with the reducing gases to replace the heat which is lost in the hearth by the reduction of solid fuel in the charge. It would, superficially be expected that combustion of the reducing gases in the hearth would supply the deficiency of heat created by the lower consumption of coke, but, as hereinbefore explained, at a proper temperature of operation of the blast furnace $CO_2$ and $H_2O$ can exist only momentarily and are immediately dissociated by contact with the hot coke. Hence, thermal gain from any combustion of these reducing gases with air is limited, and there may be, on the other hand, a thermal loss. Therefore, the heat carried by the inflowing gases must be such as to maintain proper temperature conditions in the hearth, but the gases so introduced will replace coke in reducing the ore to metal. As indicated, the auxiliary fuel is preferably at least in most instances, coke oven gas, but may be producer gas, natural gas or even liquid hydrocarbons. Various modifications may be made in the apparatus to adapt it to particular conditions of operation.

I claim:

1. In the operation of a blast furnace to reduce oxide ores to metal, the furnace having a burden of iron ore, coke and lime stone, the steps which comprise reducing the ore principally by bosh gases formed by the combustion of coke in the burden and a hot blast of air, and supplementing such reduction by introducing reducing gases free of $CO_2$ and $H_2O$ and low as compared to air in nitrogen, which gas is introduced separately from the air into the bosh, the gas having previously been heated to at least the average hearth temperature of the furnace, whereby the burden of coke may be reduced per ton of metal smelted, less air will be required, the top gases of the furnace will have a higher caloric fuel value, and the over-all effect of atmospheric humidity reduced due to the lesser amount of air.

2. In the operation of a blast furnace to reduce iron oxide ores to metal, the furnace having a burden of iron ore, coke and lime stone, the steps which comprise reducing the ore principally in the lower part of the furnace by bosh gases formed by the combustion of a hot blast of air with the coke in the furnace bottom, and supplementing such reduction by reducing gas free of $CO_2$ and $H_2O$ and low as compared to air in nitrogen, which gas is introduced into the furnace bosh separately from the air and at a temperature not substantially less than 2600° F., the gas having been heated to such temperature exteriorly of the furnace, whereby such reducing gases may directly combine with oxygen in the ore without lowering the average temperature in the bosh below 2600° F. and without absorbing heat from the incandescent coke in the bosh, such high temperature reducing gas enabling the coke burden to be somewhat reduced, the air blast volume to be likewise reduced, and causing the top gases of the furnace to be of higher caloric value, the introduction of the hot reducing gas also serving to keep the amount of water vapor due to atmospheric humidity of the air below a critical value.

3. The method of operating a blast furnace to reduce iron oxide ore to metal wherein the furnace is charged with coke, iron ore and lime stone, and wherein a part only of the burden of coke is replaced by coke oven gas, thereby enabling the gas phase of the coal to be used along with the coke phase, which comprises reducing the ore principally by bosh gases resulting from the combustion of coke and a blast of hot air in the bosh of the furnace, and to a lesser extent by first de-sulphurizing and then cracking coke oven gas to eliminate $CO_2$, $H_2O$ and hydrocarbons, and increase its volume due to such cracking, then applying heat to the cracked gas to raise the temperature thereof at least equal to the average hearth temperature in the furnace, and immediately introducing the heated gases into the bosh of the furnace so that the cracked reducing gases may directly reduce some of the ore and not disturb the heat balance of the burning coke and air.

SELWYNE P. KINNEY.

REFERENCES CITED

The following references are of record in the file of this patent:

UNITED STATES PATENTS

| Number | Name | Date |
| --- | --- | --- |
| 282,266 | Bull | July 31, 1883 |
| 190,926 | St. John | May 15, 1877 |
| 2,265,864 | Royster | Dec. 9, 1941 |
| 2,131,031 | Avery | Sept. 27, 1938 |
| 233,860 | Jerzmanowski | Nov. 2, 1880 |

FOREIGN PATENTS

| Number | Country | Date |
| --- | --- | --- |
| 8,057 | Great Britain | Apr. 21, 1893 |

OTHER REFERENCES

American Gas Practice, vol. 1, 2nd ed. pp. 625-627, Morgan. (On file in Div. 59 of Pat. Off.)